United States Patent [19]

Thomas

[11] 4,018,319
[45] Apr. 19, 1977

[54] SYNCHRONIZER ASSEMBLY

[75] Inventor: Robert L. Thomas, Jackson, Mich.

[73] Assignee: Clark Equipment Company, Buchanan, Mich.

[22] Filed: Jan. 28, 1976

[21] Appl. No.: 653,058

[52] U.S. Cl. ............................................. 192/53 E
[51] Int. Cl.² ......................................... F16D 23/06
[58] Field of Search .......................... 192/53 E, 53 F

[56] References Cited

UNITED STATES PATENTS

| 3,078,975 | 2/1963 | Eaton | 192/53 E |
| 3,910,390 | 10/1975 | Eichinger | 192/53 E |

*Primary Examiner*—Allan D. Herrmann
*Attorney, Agent, or Firm*—Ernst H. Ruf

[57] ABSTRACT

An improved synchronizer assembly for use with jaw tooth clutch means in speed change gearing of the type wherein an axially movable clutch sleeve is interposed between two gears rotatably journalled on the same shaft for the purpose of selectively connecting the gears with the shaft, with the assembly including two friction cone synchronizer rings which are spaced apart by blocker pins, said assembly further including longitudinally split pin assemblies that cooperate with the clutch sleeve and effect snap judgment of the clutch sleeve teeth with the gear clutch teeth. The improved split pin assemblies include central annular grooves having opposed dual inner and outer ramps, the steep inner ramps permitting positive force transfer while the shallower outer ramps enhance the return of the clutch sleeve to its center position. The synchronizer ring recesses that receive the split pin ends are loop-shaped to permit greater angular movement and reduce spring set while each blocker pin includes a pair of oppositely directed and symmetrical transversely split short pins that are case hardened and have portions thereof cast into their associated synchronizer rings, the latter preferably being of diecast aluminum.

18 Claims, 6 Drawing Figures

SYNCHRONIZER ASSEMBLY

BACKGROUND OF THE INVENTION

1. Field of the Invention

The field of art to which this improvement pertains includes a synchronizer assembly for toothed clutches in speed change transmissions having gears which are constantly in mesh, particularly for motor vehicles and the like for clutching either of a pair of gears to a shaft on which the gears are rotatably journalled.

2. Description of the Prior Art

The form of clutch synchronizer assemblies to which this invention is applicable includes an axially slidable clutch collar member that is mounted on a splined portion of a shaft on which a pair of axially spaced gears are rotatably mounted. The clutch collar member is provided with jaw clutch teeth which are adapted to be disposed in engagement with jaw clutch teeth formed on the rotatable gears for positively clutching either one of the gears to the shaft. The clutch collar member is formed with a radially extending flange having a plurality of circumferentially spaced openings therethrough and parallel to the shaft. Disposed through certain ones of these openings are pins which are fixed at their ends and synchronizer rings that are adapted to cooperate with the aforesaid gears. The pins have reduced central portions which define shoulders that are adapted to cooperate with the flange opening edges for blocking relative axial movement of the latter with respect to the synchronizer rings when they are rotating asynchronously. Disposed through others of said flange openings are a plurality of longitudinally split pin assemblies which are freely received at their ends in recesses formed in the synchronizer rings. The split pin assemblies are formed with central annular grooves which are biased into engagement with the peripheries of the openings in the clutch collar member flange by resilient means disposed between portions of each pin assembly. Upon initial axial movement of the clutch collar member, the synchronizer rings are caused to move conjointly therewith by the split pin assemblies. After one of the synchronizer rings has been disposed in clutching engagement with the adjacent gear and synchronous speed is attained between the gear and the clutch collar member, further axial movement of the latter will cause the portions of the split pin assemblies to compress or collapse, which cocks the latter and effects snap judgment of the jaw clutch teeth of the clutch collar member with the jaw clutch teeth of the gear.

An example of one prior art synchronizer which is widely used is disclosed and claimed in U.S. Pat. No. 2,667,955 to Bixby, dated 2 Feb. 1954 which is assigned to the same assignee as the present invention. Further prior art patents of this type include U.S. Pat. No. 3,078,975 to Eaton and U.S. Pat. No. 3,910,390 to Eichinger.

While the Bixby synchronizer assembly has been widely used and has been very successful, certain problems, about to be described, have remained, which problems have been recognized and solved by the present invention.

The most serious problem associated with this prior art synchronizer is the occasional incomplete return to the neutral position of the intermediate collar member upon its disengagement from either of its associated gears. While further gears (other than those associated with this particular synchronizer) can readily be shifted, upon the operator's attempt to shift back into the gear from which there was an incomplete return to the neutral position, there can be no force transfer from the collar member through the split pin assemblies to the synchronizer ring. In the absence of the required angular displacement of the clutch collar relative to the synchronizer ring, the blocker pins do not block and the shift into the gear will be accomplished without the benefit of synchronization which cna result in serious clashing problems accompanied by excessive noise and possible losses of portions of the clutching teeth.

A further problem has been known to occur in the form of excessive ramp wear at the intersections of the dual ramps associated with the blocker pin grooves. While it may seem obvious to harden these steel pins, they could only be induction hardened in the groove areas since the outer ends of the pins have to be soft enough to permit their subsequent riveting to the synchronizer rings which, of course, precludes case hardening.

An additional prior art problem is that the spring members between the split pins are compressed during the relative angular displacement between the clutch collar member and the synchronizer rings which, together with the use of high rate spring members, produced a set in these spring members after a limited number of cycles.

A yet further problem is that the diametral extent of the synchronizer ring recesses are insufficient to permit the previously-described angular movement without compressing the spring members thereby again causing premature spring set.

SUMMARY OF THE INVENTION

This invention solves the previously-described prior problems by improving both the blocker and split pin assemblies along with the attachment of the blocker pins, and the minimizing of the undesirable spring set.

In summary, each of the split pin assemblies has been provided with an annular groove that is slightly wider than the collar flange and wherein the groove has opposed dual inner and outer ramps. The steep inner ramps assure a more positive force transfer from the clutch collar member to the synchronizer rings whereas the shallower outer ramps enhance the return of the collar member back to the center position between the synchronizer rings. Furthermore, each of the recesses that receives the ends of the split pin assemblies has been changed from a circular to a loop shape which not only permits better angular movement of the collar member relative to the sychronizer rings but also permits greater spreading of the split pin halves thereby reducing spring set. Furthermore, the resilient means between the split pins are made of low rate springs and have been revised so as to inhibit the split pin assemblies from twisting and rotating in the loop-shaped recesses.

The blocker pin construction has been modified in that each blocker pin is made up of a pair of oppositely directed and symmetrical split short pins that are case hardened for wear resistance and have portions thereof cast into the synchronizer rings for retention purposes. Furthermore, the synchronizer ring structure itself has been changed to material having a lower melting temperature so as to permit diecasting and the casting in of the blocker short pins. Preferably an aluminum alloy is utilized which, in addition to permitting diecasting, also has the unexpected benefit of permitting greater embeddability in case foreign particles should become trapped in the cone surfaces of the synchronizer rings.

Other features and advantages of this improved synchronizer assembly will become more readily understood by persons skilled in the art when following the detailed description in conjunction with the drawings.

DESCRIPTION OF THE PREFERRED EMBODIMENT

Figure 1:
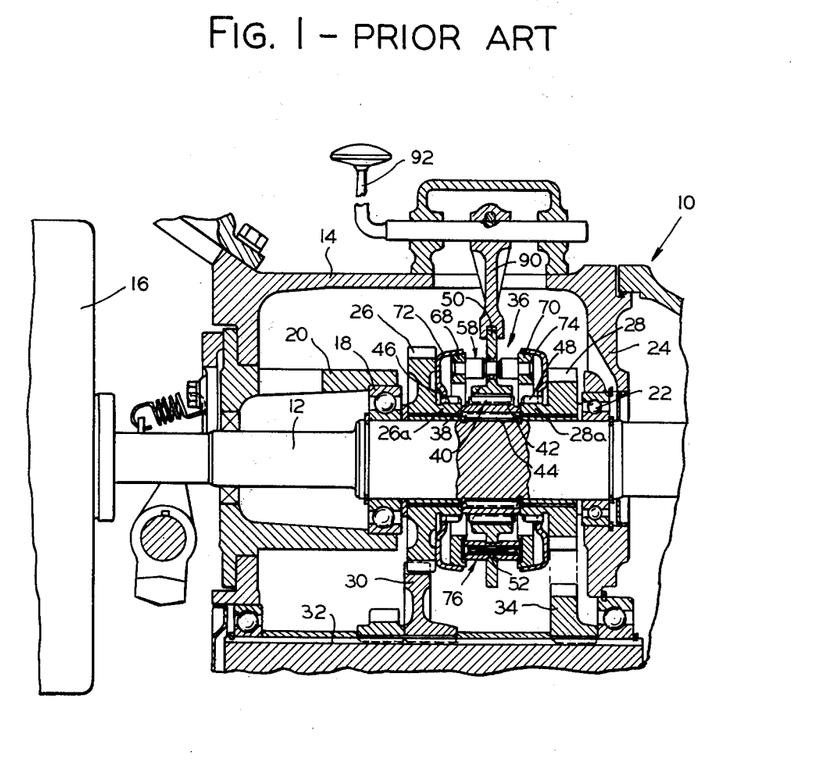
FIG. 1 is a fragmentary view, in longitudinal section, of a transmission embodying a prior art synchronizer mechanism.

Referring now to the drawings in detail, in FIG. 1, there is shown a portion of a prior art constant mesh gear type change-speed transmission which is generally denominated by the numeral 10. The illustrated transmission can be utilized in a vehicle and is adapted to be connected in the drive line between the prime mover and the drive wheels in the usual manner to provide forward and reverse speeds as well as a plurality of speed ratios. The protion of the transmission shown includes an input shaft together with the usual gears and other parts associated therewith, the input shaft being indicated by numeral 12. The transmission is enclosed in housing 14, only a portion of which is shown.

Input shaft 12 is adapted to be driven by a prime mover (not shown) when a main clutch 16 of any conventional type is engaged. Input shaft 12 is rotatably supported in housing 14 by means of a ball bearing 18, carried by an inwardly extending circular bracket structure 20, and a ball bearing 22 mounted in internal wall portion 24 of transmission housing 14. A pair of gears 26 and 28 are rotatably journalled about the axis of shaft 12 and are arranged to be selectively clutched thereto.

Gear 26 may be referred to as the forward gear, in as much as when gear 26 is clutched to shaft 12, forward operation of the vehicle is provided, while the clutching of gear 28 to shaft 12 provides for reverse operation. Gear 26 is in constant mesh with gear 30 secured to a shaft or countershaft 32, while gear 28 is in mesh with an idler gear (not shown), which in turn is in mesh with a gear 34 which likewise is secured to countershaft 32.

For selectively connecting either of gears 26 or 28 to shaft 12, a prior art synchronizer and clutch mechanism 36 is disposed concentrically about shaft 12, intermediate of rotatable gears 26 and 28. Prior art mechanism 36 includes an intermediate clutch collar member or coupling sleeve 38 which is connected by splines, at 40, to an intervening sleeve member or sleeve carrier 42 which in turn is connected by splines, at 44, to input shaft 12. It should be understood that the interposition of sleeve 42 is merely to facilitate assembly, and if desired, collar member 38 could be splined directly to input shaft 12. Gear 26 has an axially extending shoulder portion 26a which has a plurality of jaw teeth 46 around the periphery thereof. Teeth 46 are adapted to mesh with internal teeth 38a. (FIG. 2) on collar 38 when collar 38 is moved to the left from its centered or neutral position illustrated in FIGS. 1 and 2. Teeth 38a also form a portion of spline connection 40. Similar to gear 26, gear 28 also has an axially extending portion 28a which is provided with a plurality of external jaw teeth 48 thereon. Teeth 48 likewise are adapted to mesh with collar teeth 38a when collar 38 is moved to the right from its neutral position.

Figure 2:
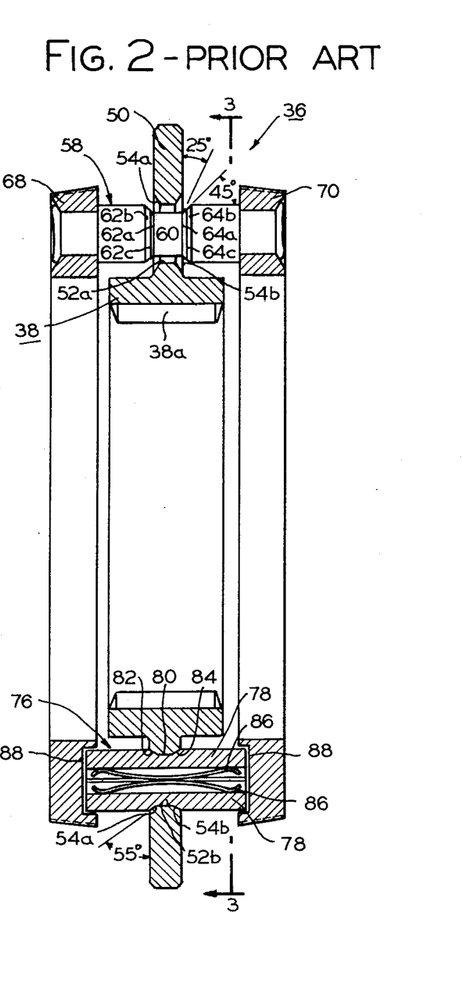
FIG. 2 is an enlarged sectional view taken through the prior art synchronizer of FIG. 1.
Figure 3:
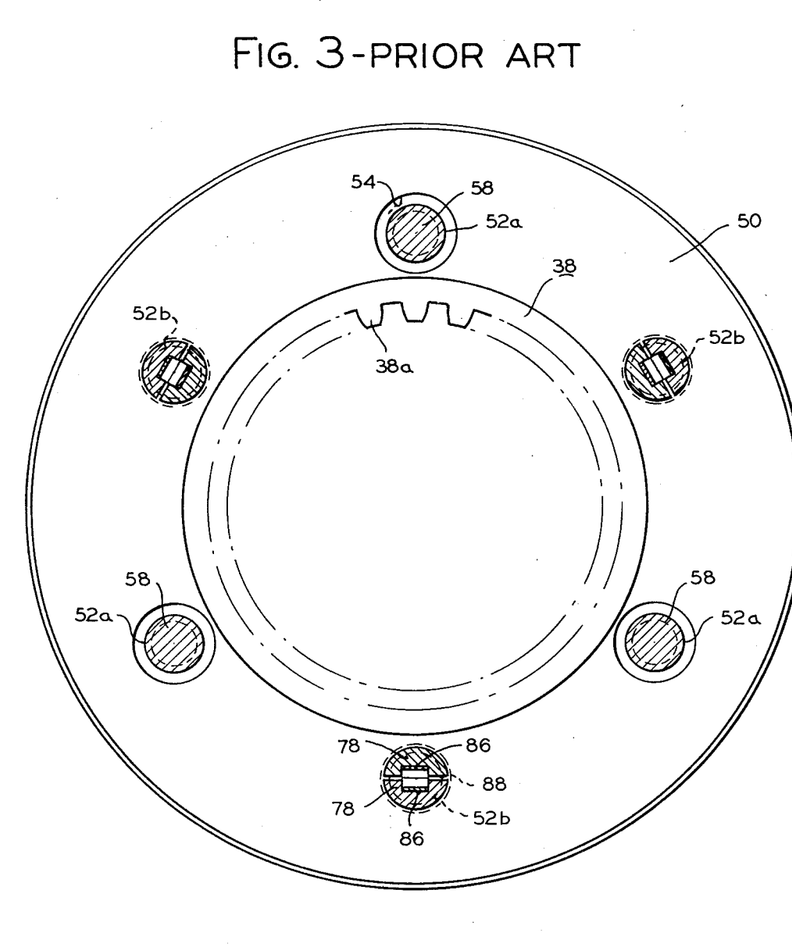
FIG. 3 is a sectional view taken along line 3—3 of prior art FIG. 2.

Collar 38 is provided with a radially outwardly projecting annular flange portion 50 which has a plurality of circular apertures or openings 52, in this case six openings, as best seen in FIG. 3. The edges 54 of openings 50 are beveled or countersunk. Disposed through alternate openings or apertures 52a are solid or blocker pins 58 which are of the shape seen best in FIG. 2. Each of solid pins 58 has a central annular groove 60 and opposed dual-tapered blocking shoulders or ramps 62a, 62b and 64a, 64b. The angles of inclination of ramps 62a, 64a are 25° from the vertical whereas ramps 62b, 64b are 45°, with ramps 62a, 62b and ramps 64a, 64b intersecting at lines 62c, 64c, respectively. Blocker pins 58 have reduced end portions which are rigidly secured such as by riveting, within openings formed in a pair of axially spaced sychronizer ring or friction clutch members 68 and 70. Each of synchronizer ring members 68, 70, which are of a bronze alloy composition, has a frusto-conical or tapered outer surface which is adapted to coact with cone clutch members 72 and 74 (FIG. 1), respectively, which are secured to gears 26 and 28 respectively. Members 68 and 72 coact to form a friction cone clutch and members 70 and 74 coact to form another friction cone clutch. While members 72 and 74 are described and illustrated herein as separate members secured to gears 26 and 28 respectively, it should be understood that these members can be formed integrally with the gears in many applications, and it is convenient to do so particularly when the gears are of larger diameter relative to the other parts of the mechanism. Furthermore, reference herinafter in the claims to the synchronizer rings contacting the gears is intended to apply both to the synchronizer rings contacting separate members secured to the gears as shown, or to the synchronizer rings contacting the gears directly.

Disposed through the other alternate openings 52b in collar member flange portion 50 are split or energizer pin assemblies indicated generally by the numeral 76 (best seen in FIG. 2). Each split pin assembly comprises a pair of identical and generally semi-cylindrical segments or shell members 78, having central semi-annular grooves 80 and tapered or single ramp opposed shoulders 82 and 84 formed therein. The angle of inclination of ramps or shoulders 82, 84 is 55° from the vertical. Interposed between shell members or segments 78 are two spring members 86 formed to the illustrated X-shape or other equivalent shape. Springs 86 bias the segment portions apart and normally urge such segments into contact with the inner peripheral surfaces of the respective collar flange openings 52b. As best seen in FIG. 2, grooves 80 mate with apertures 52b whereas shoulders 82, 84 mate with aperture edges 54a, 54b. Suitable circumferentially spaced circular recesses 88 are formed in the facing surfaces of synchronizer ring members 68 and 70, which recesses receive the ends of the split pin assemblies 76. The diameters of recesses 88 are large enough to permit a slight angular displacement or "clocking" between the combined collar-split pin assembly (elements 38 and 76) and the synchronizer ring-solid pin assembly (elements 68 and 70 coupled via pins 58), as will be explained in more detail hereinafter.

Before describing the operation of synchronizer and clutch mechanism 36, it will be appreciated that the axial shifting of collar 38 is accomplished by a conventional shifter mechanism which includes a shifter fork 90 that is suitably connected to collar flange portion 50 and a shift lever 92 projecting outside transmission housing 14 and connected to shifter fork 90.

In operation, upon the rotation of input shaft 12, drive may be effected to countershaft either through gears 26 and 30 or through gears 28, an idler gear (not shown) and gear 34. With the prior art synchronizer and clutch mechanism 36 in the centered or neutral position, as shown in FIG. 1, axial movement of clutch collar member 50 to the left, from the position shown in FIG. 1, may be effected by shift lever 92 through shift fork 90. Initial movement of collar member flange portion 50 to the left, for example, carries synchronizer rings 68 and 70 therewith, since the central semi-annular grooves 80 of split pin assemblies 76 are biased into engagement with the peripheries or edges 54a of apertures 52b in collar flange portion 50. Further axial movement of collar member 38 to the left pushes synchronizer ring 68 to the left until it engages clutch member 72 connected to gear 26. Such engagement causes synchronizer rings 68, 70 and blocker pins 58 to be slightly angularly or circumferentially displaced relative to flange 50, with this displacement also being referred to as "clocking", which results in blocker pins 58 moving out of a concentric relationship relative to apertures 52a. Slip occurs during the initial engagement of synchronizer ring 68 with clutch member 72, and thus gear 26 and synchronizer ring 68 rotate asynchronously. During this initial engagement, shoulders or ramps 62a of blocker pins 58 are disposed in blocking relation with respect to beveled edges 54a of the adjacent openings 52b in flange portion 50, which prevents the axial movement of clutch collar member 38 relative to synchronizer rings 68 and 70. As previously noted, the diameter of circular recesses 88 is such that the desired clocking and required blocking can take place. It should be understood that shoulders or ramps 82 of split pin shell members 78 also cooperate with or abut aperture edges 54a so as to transfer the load being exerted on collar member 38, by the operator, into split pin shell member 78 so as to permit clocking.

When synchronization is achieved, i.e., after synchronizer ring 68 and member 72 have been fully engaged and they rotate synchronously, flange 50 is unblocked and blocker pins 58 are then permitted to move back (circumferentially) so that shoulders 62a no longer block the axial movement of collar member 38 relative to synchronizer rings 68 and 70, i.e., shoulders or ramps 62a, 62b are in alignment or coaxial with apertures 52a in flange 50. The greater taper of ramp 62b permits easier shifting.

Thereafter, continued motion of flange 50 toward the left compresses spring members 86 of split ring assembly 76 and allows flange 50 to pass over shell member shoulders 82 and move on to the left whereby teeth 38a on collar 38 enter into meshing relation with teeth 46 on gear 26, thereby providing a positive connection. While but a single split pin assembly 76 was used in this description of operation, it will be appreciated that generally three such assemblies are utilized and that all of them function simultaneously in the same manner. Furthermore, there are also generally three solid or blocker pins 58 which function in unison. It should also be understood that the compression of spring members 86 cocks split pin assemblies 76 and produces a snap action that helps to center collar flange portion 50 with reference to grooves 80 of assemblies 76.

In a like manner, clutch collar member 38 may be moved axially to the right from the position shown in FIG. 1 by the use of shift lever 92 acting through shift fork 90. Since the engagement of collar teeth 38a is affected in the same manner as previously described, it is believed that a detailed description thereof is unnecessary. When collar teeth 38a are disposed in engagement with teeth 48 of gear 28, a reverse drive ratio is affected between input shaft 12 and countershaft 32.

While prior art synchronizer and clutch mechanism 36 has been widely used and has been very successful, certain problems, about to be described, have arisen, which problems have been recognized and solved by the present invention.

The most serious problem associated with prior art synchronizer and clutch mechanism 36 is the occasional incomplete return to neutral position of collar member 38, upon the disengagement thereof from either of gears 26 or 28. Assume for the moment, that gear 28 is second gear and that gear 26 is third gear and that there is a further fourth gear (not shown) that is served by another synchronizer mechanism 36. Further assume that the operator has shifted out of third gear and that gear 26 has actually been disconnected from shaft 12, but that collar member 38 has not fully returned to its neutral or centered position, which means that central grooves 80 of split pin assemblies 76 are not centered in apertures 52b, i.e., assemblies 76 are compressed and ramps 82 are not in contact with aperture edges 54a. While the operator can readily shift into fourth gear, upon his attempt to shift back into third gear, since pin assemblies 76 are not spread and there is no interaction between ramps 82 and edges 54a, there will be no force transfer from collar member 38 through split pin assemblies 76 to synchronizer ring 68 to cause the latter to abut and coact with clutch member 72. In the absence of the required clocking, blocker pins 58 do not block but are rather aligned with apertures 52a and the shift into third gear will be accomplished without the benefit of synchronization, i.e., collar member 38 is moved directly into engagement with jaw teeth 46 on gear 26 which, in the absence of the proper indexing therebetween, can produce serious clashing problems accompanied by excessive noise and possible losses of portions of teeth 46 and/or 38a.

A further problem has been known to occur in the form of excessive ramp wear at intersections 62c and 64c of steel blocker pins 58. As previously noted, ramps 62a and 64a provide the required blocker function until the speeds of synchronizer 36 and gears 26 and 28 are fully syncronized, whereas the function of ramps 62b, 64b was to improve the ease of shifting once the synchronization point had been reached. However, the difference in ramp angles (25° on ramps 62a, 64a, versus 45° for ramps 62b, 64b) has produced excessive wear at the intersections 62c and 64c of ramps 62a, 62b and 64a, 64b, respectively. While it may seem obvious to harden steel pins 58, they could only be induction hardened in and adjacent to groove are 60, since the outer ends of pins 58 have to be soft enough to permit their subsequent riveting to synchronizer rings 68 and 70. This of course precludes case hardening which would have hardened the whole pin.

A further problem with prior art structure 36 is that spring members 86 were compressed during clocking which together with the use of high rate (approximately 75 pounds per inch) springs, produced a set in spring members 86 after a limited number of cycles thereby impairing the positive loading and spreading of split pin shell members 78 in the neutral position which means that both clocking and the full positive return to the neutral position are jeopardized.

A yet further problem with prior art structure 36 is that the diametral extent of recesses 88 is insufficient to permit the full required clocking travel without compressing spring members 86, thereby again causing the spring members 86 to take a premature set.

Figures 4, 5, 6:
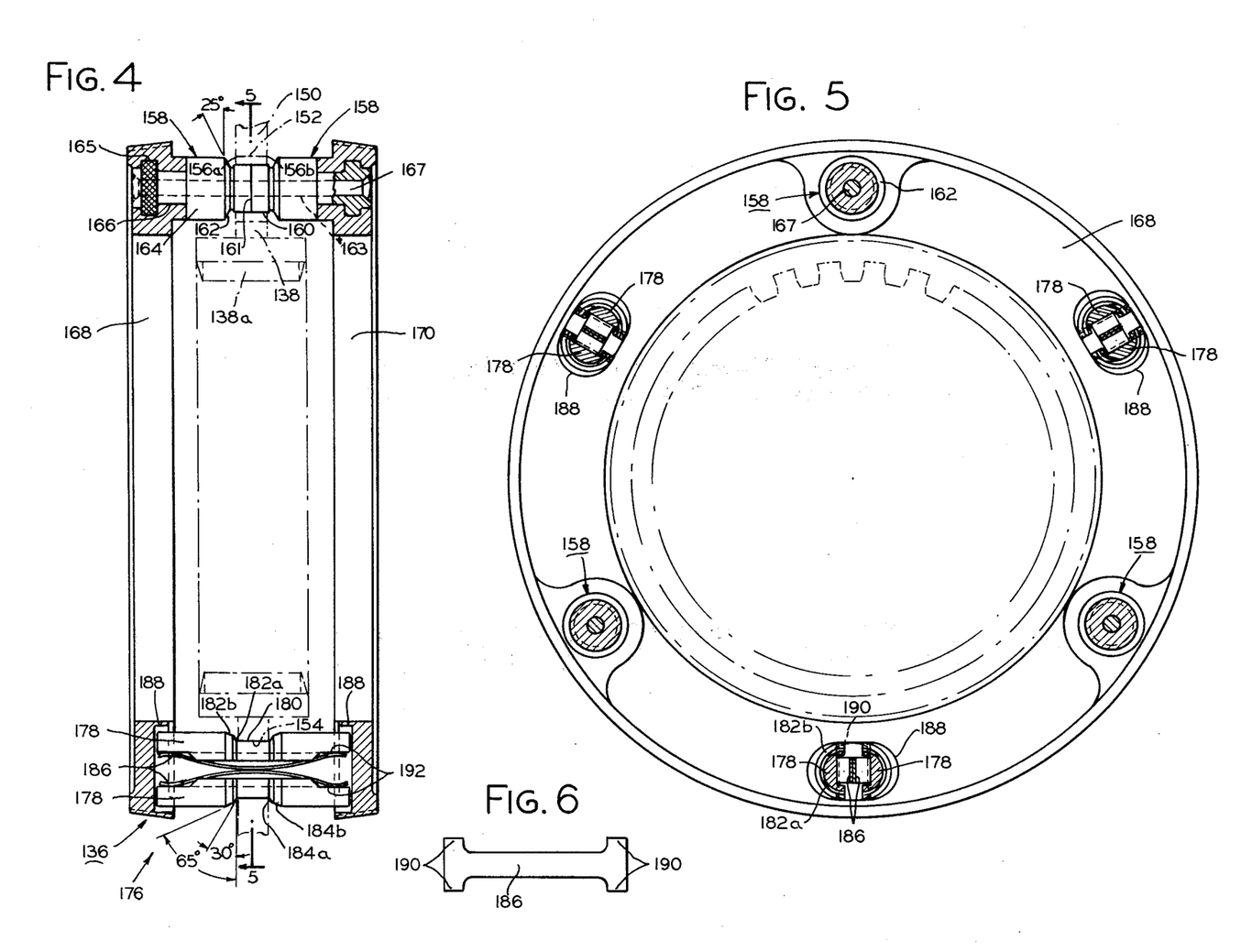
FIG. 4 is a view similar to that of FIG. 2 but shows the improved sychronizer mechanism of this invention.
FIG. 5 is a sectional view taken along line 5—5 of FIG. 4.
FIG. 6 is a top plan view of a resilient member utilized in the improved synchronizer mechanism.

FIGS. 4–6 show improved synchronizer mechanism 136 which solves the problems associated with prior art synchronizer mechanism 36. As best seen in FIG. 4, improved synchronizer assembly 136 includes collar member or coupling sleeve 138 having tooth portions 138a, flange portion 150 and apertures 152, 154. Collar member 138 differs from collar member 38 only in that the former's apertures are not relieved or countersunk but rather have sharp edges 156a, 156b. Each prior art blocker pin 58 is replaced with a pair of oppositely directed and symmetrical transversely split short pins 158, each having a groove portion 160, a single taper ramp or shoulder 162 forming an angle of 25° with the vertical, a main diameter portion 164, an end portion 165, a connecting portion 166 and an axial bore 163.

Each short pin 158 has its end portion 165 and connecting portion 166 fixedly embedded in one of synchronizer rings 168 and 170, with the synchronizer rings being diecast around the noted portions of short pins 158 so as to retain them mechanically. Fo assembly, inner ends 161 of groove portions 160, are physically abutted and axially aligned, with adjoining short pins 158 being held against both radial and axial movement by a rivet 167 extending through bore 163, with rivet 167 also of course rigidly connecting synchronizer rings 168 and 170. Not only are short pins 158 case hardened for greater wear resistance, but in addition, single ramps 162 have a uniform slope, thereby eliminating wear areas 62c and 64c of prior art structure 36.

Since the high melting point of the prior art sand cast or forged bronze composition synchronizer rings 68 and 70 precludes the casting thereof around case hardened short pins 158 without substantially decreasing their hardness, improved synchronizer rings 168 and 170 are composed of an aluminum alloy composition (such as, for example, ALCOA X-392 high silicon Al alloy which has a much lower melting point (1375°–1400° F.) than the bronze alloy). Thus, short pins 158 solve the prior art blocker pin wear problem.

The problem of incomplete return of prior art collar 38 to its neutral position has been solved by utilizing improved split pin assemblies 176 which include opposed sheel members 178 and spring members 186. This solution includes three distinct improvements:

1. Shell members 178 are provided with central semicircular annular grooves 180, with the minimum width of groove 180 being the same as the maximum width of collar flange portion 150, thus permitting more accurate centering (location). This is in contrast with prior art grooves 80 which are slightly narrower than the width of collar member flange portions 50.

2. The single ramp angle (55° from the vertical) of prior art shell member ramps 82, 84, has been changed to dual ramps 182a, 182b and 184a, 184b. Inner ramps or shoulders 182a, 184a have an angle of 30° from the vertical, with this steep angle permitting a more positive force transfer for clocking, i.e., assuring that the force applied by the operator to flange portion 150 is transferred by split pin assemblies 176 to synchronizer rings 168 and 170 in order to achieve the necessary clocking. The angle of outer ramps or shoulders 182b, 184b is 65° from the vertical, with this angle and the greater axial extents thereof (relative to the aperture edges) easing the return of flange portion 150 back to its neutral or centered position.

3. Furthermore, the depth of central grooves 180 is twice as deep as that of prior art grooves 80 (0.0625 versus 0.0313 inches). The combination of the angles of shoulders 182a, 184a, together with the greater depth of grooves 180 increases the centering distance from about the width of prior art flange portion 50 and the axial extent of shoulders 54a, 54b, to that of collar member flange portion 150 plus the axial extents of shoulders 182a, 182b, 184a, 184b. This permits centering not only over a wider range, but also increases the accuracy thereof.

In order to permit positive loading and the proper separation of shell members 178 in the neutral position, spring members 186 are constructed to have a low (approximately 40 pounds per inch) spring rate for greater deflection. Furthermore, in order to avoid compressing the spring members 186 during clocking, each recess 188 in synchronizer rings 168 and 170 has been changed from the prior art circular shape to an oblong or loop shape 188 (best seen in FIG. 5) whose minor axis lies on a radial line relative to synchronizer rings 168, 170. In order to inhibit shell members 178 from twisting or rotating in oblong recesses 188, spring members 186 are generally I-shaped by having ears or tabs 190 on each end thereof (see FIG. 6), with tabs 190 being receivable in shell member relief areas 192. It should be noted that split pin assembly 176, in FIG. 4, is shown revolved 90° from its normal position, for the sake of clarity, with the true position thereof being shown in the lower portion of FIG. 5.

Therefore, improved synchronizer and clutch assembly 136 solves the hub centering problem by increasing the overall width of groove 180, using sharp-edged apertures 156, and using dual ramp split pin shoulders, the outer portions 182b, 184b, of the latter enhancing the sliding of flange aperture sharp edges 156a, 156b, respectively, thereby improving the centering of collar member 138. The prior art solid pin ramp wear is eliminated by using case hardened short pins 158 together with a single ramp structure 162. Clocking is enchanced by split pin steep inner ramp portions 182a, 184a which permit the force transfer from collar 138, via shell members 178, to synchronizer rings 168 and 170. Clocking is further enhanced by the oblong shape of recesses 188, with this shape also eliminating the compression of spring means 186 during clocking. Furthermore, the use of low rate springs reduces spring set and permits positive loading and separation of shell members 178 in the neutral position, thereby assuring the centering of collar member 138. The change from the bronze alloy to an aluminum alloy, in addition to permitting the diecasting of synchronizer rings 168 and 170 around short pins 158 also has the extra benefit of having greater embeddability than the tougher bronze structure. Embeddability is desired in that, if foreign particles become trapped between the conical outer syncronizer ring surfaces and the corresponding gear clutch surfaces, these foreign particles should embed in the synchronizer ring surfaces in order to maintain stable frictional characteristics between these abutting clutch portions.

A test bench comparison of the life span of prior art synchronizer and clutch mechanism 36 versus improved synchronizer and clutch mechanism 136 shows the improvement to be in excess of several hundred per cent.

From the foregoing, it is believed that those familiar with the art will recognize and appreciate the novel concepts and features of this improved synchronizer. Obviously, while the invention has been described in relation to only a single preferred embodiment, numerous variations, changes and substitutions of equivalents will present themselves to persons skilled in the art and may be made without necessarily departing from the scope and principles of this invention. Consequently, the scope of this invention should be determined solely be reference to the claims appended hereto.

What is claimed is:

1. For use in a transmission having a shaft and two axially spaced gears rotatably mounted about the axis of the shaft and with the gears having jaw clutch teeth and friction clutch elements at the facing sides thereof, the combination of a clutch and synchronizer assembly for selectively coupling either of the two gears to the shaft including, a clutch collar member axially slidable on the shaft and mounted for rotation therewith between the gears, said clutch collar member having jaw clutch teeth adapted to cooperate with the jaw clutch teeth on the gears, said collar member having openings formed therethrough parallel to the shaft, axially movable friction clutch members adapted to cooperate with the friction clutch elements on the gears, means rigidly interconnecting said axially movable friction clutch members, said means being adapted to block axial movement of said clutch collar member relative to said axially movable friction clutch members when the latter and said clutch collar members are rotating asynchronously, longitudinally split pin assemblies disposed through the openings in said clutch collar member, said axially movable friction clutch members having recesses formed therein for freely receiving the ends of said split pin assemblies, and resilient means between the portions of said split pin assemblies for spring loading the latter upon initial axial movement of said clutch member relative to said axially movable friction clutch members for effecting snap engagement of the jaw clutch teeth of the clutch collar member with the jaw clutch teeth of the adjacent gear, wherein the improvement comprises:

a. each of said split pin assemblies including a centrally located annular groove slightly wider than said flange, said groove having opposed dual inner and outer ramps;

b. each of said recesses for receiving said split pin assemblies being loop-shaped; and c. said resilient means further including means for inhibiting said split pin assemblies from twisting and rotating in said loop-shaped recesses.

2. The improved clutch and synchronizer assembly of claim 1 wherein the angle of inclination of each of said inner ramps is 30° (from the vertical) with this angle assuring a more positive force transfer from said clutch collar member to said axially movable friction clutch elements via said split pin assemblies.

3. The improved clutch and synchronizer assembly of claim 1 wherein the angle of inclination of each of said outer ramps is 65° (from the vertical) with this angle and the axial extent of each of said outer ramps, relative of said collar member openings, enchancing the return of said collar member back to a center position between said axially movable friction clutch members.

4. The improved clutch and synchronizer assembly of claim 1 wherein said means for inhibiting said split pin assemblies from twisting and rotating take the form of pairs of opposed tabs on said resilient means, said tabs being received in relief areas in said split pin assemblies.

5. The improved clutch and synchronizer assembly of claim 4 wherein said resilient means take the form of substantially I-shaped (in a top plan view) spring metal clip members having a low spring rate.

6. The improved clutch and synchronizer assembly of claim 1 further including:

a. said means rigidly interconnecting said axially movable friction clutch members includes at least two blocker pins, each blocker pin comprising a pair of oppositely directed an symmetrical transversely split short pins, said short pins having physically abutted and axially aligned groove portions so as to define a centrally located annular groove;

b. each of said short pins is case hardened and further includes a main diameter portion, an end portion, and a connecting portion between said main diameter and end portions; and c. the end and connecting portions of each one of said pair of said opposed short pins being physically retained in the adjacent one of said axially movable friction clutch members by casting portions of said axially movable friction clutch members therearound.

7. The improved clutch and synchronizer assembly of claim 6 wherein:

a. each of said short pins includes an axial central bore; and b. connecting means extending through the adjacent bores of each pair of said short pins for rigidly interconnecting said axially movable friction clutch members.

8. The improved clutch and synchronizer assembly of claim 6 wherein said casting is performed at a temperature below 1400° F. so as to minimize the reduction in hardness of said case hardened short pins.

9. The improved clutch and synchronizer assembly of claim 6 wherein said casting is performed via diecasting and said axially movable friction clutch members are composed of an aluminum alloy.

10. In a synchronizer mechanism having an intermediate collar member with a flange portion that has a plurality of apertures therein located between a pair of synchronizer rings which are joined together by a least two solid pins extending through certain of said apertures, annular groove portions on said solid pins located centrally thereof and defining a neutral position, between two extreme positions, when said groove portions are within said collar member flange portion, at least one split pin assembly extending through one of the said apertures, said split pin assembly comprising two axially extending shell members and resilient means interposed between said shell members for urging them apart, said synchronizer rings having recesses formed therein for freely receiving the ends of said shell members, wherein the improvement comprises:

a. said shell members including a centrally located annular groove slightly wider than said flange portion, said groove having opposed dual inner and outer shoulder portions, one of said inner shoulder portions being adapted to first engage said flange portion when said collar member is moved away from its neutral position toward one of its extreme positions, one of said outer shoulder portions being adapted to first engage said flange portion when said collar member is moved from one of its extreme positions toward its neutral position;

b. each of said recesses being loop-shaped, with the major axis of each loop-shaped recess being perpendicular to a radial line from the center of its associated synchronizer ring, said loop-shaped recesses minimizing a premature set in said resilient means and also permitting further angular displacement of said collar member and split pin assembly relative to said synchronizer rings and solid pins; and     c. said resilient means further including means for inhibiting said shell members from rotating in said loop-shaped recesses.

11. The improved synchronizer mechanism of claim 10 wherein the angle of inclination of each of said inner shoulder portions is 30° (from the vertical) with this angle assuring a more positive force transfer from said collar member to said synchronizer rings via said at least one split pin assembly.

12. The improved synchronizer mechanism of claim 10 wherein the angle of inclination of each of said outer shoulder portions is 65° (from the vertical) with this angle and the axial extent of each of said outer shoulder portions, relative to said flange portion apertures, enhancing the return of said collar member back to its neutral position.

13. In a synchronizer mechanism having an intermediate collar member with a flange portion having a plurality of apertures therein located between a pair of synchronizer rings which are joined together by at least two blocker pins extending through certain of said apertures, annular groove portions on said blocker pins located centrally thereof and defining a neutral position, between two extreme positions, when said groove portions are within said collar member flange portion, a split pin assembly extending through one of said apertures, said split pin assembly comprising two axially extending shell members and resilient means interposed between said shell members urging them apart, said synchronizer rings having recesses formed therein for freely receiving the ends of said shell members, within the improvement comprises:

a. each of said blocker pins comprises a pair of oppositely directed and symmetrical transversely split short pins, said short pins having physically abutted and axially aligned groove portions so as to define a centrally located annular groove;

b. each of said short pins is case hardened and further includes a main diameter portion, an end portion and an intermediate connecting portion between said main diameter and end portion; and     c. the end and connecting portions of each one of said pair of said opposed short pins being physically retained in the adjacent one of said synchronizer rings by casting portions of said adjacent one of said synchronizer rings therearound.

14. The improved synchronizer mechanism of claim 13 wherein:

a. each of said short pins includes an axial central bore; and     b. connecting means extends through the adjacent bores of each pair of said short pins for rigidly interconnecting said pair of synchronizer rings.

15. The improved synchronizer mechanism of claim 14 wherein:

a. said casting is performed via diecasting at a temperature below 1400° F. so as to minimize the reduction in hardness of said case hardened short pins; and     b. said synchronizer rings are comprised of an aluminum alloy in order to increase the embeddability thereof.

16. A synchronizing device for selectively connecting an intermediate rotatable member positively to either of a pair of rotatable members located respectively adjacent the ends of said intermediate member, said synchronizing device comprising in combination:

a. means for shifting said intermediate member into coupling engagement with either of said pair of rotatable members, said shifting means including a flange portion on said intermediate member, with said flange portion having a plurality of holes therein;

b. synchronizer means carried by said flange portion for rotation therewith but movable axially relative thereto, said synchronizer means including a pair of axially spaced synchronizer rings located one adjacent each end of said shifting means and arranged to engage frictionally the respective adjacent rotatable member, said synchronizer rings being maintained in said axially spaced relation by a plurality of cylindrical blocker pins wherein each blocker pin comprises a pair of oppositely directed and symmetrical transversely split short pins, said short pins having physically abutted and axially aligned groove portions so as to define a centrally located first annular groove thereon slightly wider than said flange portion, said holes in said flange being concentric with said first annular groove when said shifting means is in a neutral position and the diameter of said holes is slightly greater than the cylindrical portion of said blocker pins so that said flange portion can move in an encircling relation with said cylindrical portion, each of said short pins being case hardened and further including a main diameter portion, and a connecting portion between said main diameter and end portions, and the end and connecting portions of each one of said pair of opposed short pins being physically retained in the adjacent ones of said axially spaced synchronizer rings by casting portions of said synchronizer rings therearound;

c. a plurality of split pin devices extending between said pair of synchronizer rings, said plural split pin devices each including a centrally located second annular groove therein, said groove having opposed dual inner and outer ramps, the inner ramps of said second annular groove being engaged by at least a portion of the rim of each of certain others of said holes when shifting is initiated from said neutral position, said synchronizer rings having recesses formed therein for freely receiving the ends of said split pin devices, said split pin devices also including resilient means therebetween to urge said split pins into engagement with the interior surface of said certain others of said holes to bias said flange portion circumferentially toward a position wherein said certain ones of said holes are concentric with said blocker pins; and d. each of said recesses for receiving said split pin devices being loop-shaped for minimizing a premature set in said resilient means and also permitting further angular displacement of said intermediate member and split pin devices relative to said synchronizer rings and blocker pins, said resilient means further including means for inhibiting said split pin assemblies from twisting in said loop-shaped recesses.

17. The sychronizing device of claim 16 wherein the angle of inclination of each of said inner ramps is 30° (from the vertical) with this angle assuring a more positive force transfer from said intermediate member to said synchronizer rings via said split pin devices.

18. The synchronizing device of claim 16 wherein the angle of inclination of each of said outer ramps is 65° (from the vertical) with this angle and the axial extent of each of said outer ramps, relative to said certain others of said flange holes, enhancing the return of said intermediate member back to its neutral position between said axially spaced synchronizer rings.

* * * * *